(12) United States Patent
Sadaghiani et al.

(10) Patent No.: US 10,491,617 B1
(45) Date of Patent: Nov. 26, 2019

(54) SYSTEMS AND METHODS CONFIGURING A SUBSCRIBER-SPECIFIC ENSEMBLE OF MACHINE LEARNING MODELS

(71) Applicant: Sift Science, Inc., San Francisco, CA (US)

(72) Inventors: Fred Sadaghiani, San Francisco, CA (US); Alex Paino, San Francisco, CA (US); Jacob Burnim, San Francisco, CA (US); Janice Lan, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 16/427,924

(22) Filed: May 31, 2019

(51) Int. Cl.
  *G06F 21/00* (2013.01)
  *H04L 29/06* (2006.01)
  *G06N 20/00* (2019.01)

(52) U.S. Cl.
  CPC ......... *H04L 63/1425* (2013.01); *G06N 20/00* (2019.01); *H04L 63/1416* (2013.01)

(58) Field of Classification Search
  CPC .. H04L 63/1425; H04L 63/1416; G06N 20/00
  See application file for complete search history.

(56) References Cited

U.S. PATENT DOCUMENTS

| | | | |
|---|---|---|---|
| 7,945,545 B1 | 5/2011 | Sorkin et al. | |
| 9,043,894 B1 * | 5/2015 | Dennison | G06F 16/9535 726/11 |
| 9,838,407 B1 | 12/2017 | Oprea et al. | |
| 2013/0326625 A1 * | 12/2013 | Anderson | G06F 21/56 726/23 |
| 2015/0373039 A1 * | 12/2015 | Wang | H04L 63/1425 726/23 |
| 2015/0373043 A1 | 12/2015 | Wang et al. | |
| 2016/0092684 A1 | 3/2016 | Langton et al. | |
| 2017/0279828 A1 * | 9/2017 | Savalle | H04L 63/1416 |
| 2018/0004948 A1 | 1/2018 | Martin et al. | |

* cited by examiner

*Primary Examiner* — Kendall Dolly
(74) *Attorney, Agent, or Firm* — Jeffrey Schox; Padowithz Alce

(57) ABSTRACT

A machine learning-based system and method for identifying digital threats that includes implementing a machine learning-based digital threat mitigation service over a distributed network of computers; constructing, by the machine learning-based digital threat mitigation service, a subscriber-specific machine learning ensemble that includes a plurality of distinct machine learning models, wherein each of the plurality of distinct machine learning models is configured to perform a distinct machine learning task for identifying a digital threat or digital fraud; constructing a corpus of subscriber-specific digital activity data for training the plurality of distinct machine learning models of the subscriber-specific ensemble; training the subscriber-specific ensemble using at least the corpus of subscriber-specific digital activity data; and deploying the subscriber-specific ensemble.

15 Claims, 6 Drawing Sheets

200

Constructing A Subscriber Ensemble S210

Constructing a Subscriber Corpus S220

Training Subscriber Ensemble S230

Calibrating Subscriber Ensemble S240

Deploying the Subscriber Ensemble S250

FIGURE 2

SYSTEMS AND METHODS CONFIGURING A SUBSCRIBER-SPECIFIC ENSEMBLE OF MACHINE LEARNING MODELS

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTIONS

In one embodiment, a machine learning-based system for identifying digital threats includes a machine learning-based digital threat mitigation service implemented by a distributed network of computers that: constructs a subscriber-specific machine learning ensemble of a plurality of distinct machine learning models, wherein each of the plurality of distinct machine learning models is configured to perform a distinct machine learning task for identifying a digital threat or digital fraud; constructs a corpus of subscriber-specific digital activity data for training the plurality of distinct machine learning models of the subscriber-specific machine learning ensemble; trains the subscriber-specific machine learning ensemble using at least the corpus of subscriber-specific digital activity data; and deploys the subscriber-specific machine learning ensemble.

In one embodiment, the machine learning-based digital threat mitigation service: calibrates threat scores generated by the subscriber-specific machine learning ensemble against threat scores generated by a pre-existing, global machine learning model; and migrates the subscriber from the pre-existing, global machine learning model to the subscriber-specific machine learning ensemble based on the calibration.

In one embodiment, deploying the subscriber-specific machine learning ensemble is based on a successful calibration of threat scores produced by the subscriber-specific machine learning ensemble; and deploying the subscriber-specific machine learning ensemble includes exposing the threat scores of the subscriber-specific machine learning ensemble in lieu of threat scores produced by a pre-existing, global machine learning model that is implemented by the machine learning-based digital threat mitigation service.

In one embodiment, subscriber-specific digital activity data includes data relating to a plurality of transactions performed by online users or the like using one or more online resources and/or services of the subscriber to the digital threat scoring service In one embodiment, the subscriber-specific machine learning ensemble comprises a machine learning-based digital threat scoring model that is associated with an account of the subscriber hosted by the machine learning-based digital threat mitigation service.

In one embodiment, a composition of the plurality of distinct machine learning models defining the subscriber-specific machine learning ensemble is based on one or more attributes of the corpus of subscriber-specific digital activity data.

In one embodiment, the plurality of distinct machine learning models defining the subscriber-specific machine learning ensemble include a subset distinct machine learning models selected from a plurality of machine learning models made available by the machine learning-based digital threat mitigation service.

In one embodiment, the machine learning-based digital threat mitigation service: sets a training and/or validation configuration of the corpus of subscriber-specific digital activity data, wherein setting the training and/or validation configuration includes configuring the corpus of subscriber-specific digital activity data to make available only a first subset of the corpus of subscriber-specific digital activity data during a first phase of training the subscriber-specific machine learning ensemble.

In one embodiment, the machine learning-based digital threat mitigation service: sets a training and/or validation configuration of the corpus of subscriber-specific digital activity data, wherein setting the training and/or validation configuration includes configuring the corpus of subscriber-specific digital activity data to make available only a second subset of the corpus of subscriber-specific digital activity data during a second phase of validating the subscriber-specific machine learning ensemble.

In one embodiment, the machine learning-based digital threat mitigation service to a plurality of distinct subscribers; and the subscriber-specific machine learning ensemble is distinct from other subscriber ensembles associated with other subscribers of the plurality distinct subscribers.

In one embodiment, the machine learning-based digital threat mitigation service: identifies weights of a component mixture of the subscriber-specific machine learning ensemble during a validation phase of the subscriber-specific machine learning ensemble, wherein the validation phase of the subscriber-specific machine learning ensemble is performed using a prescribed subset of the corpus of subscriber-specific digital activity data.

In one embodiment, identifying weights includes: computing a linear set of weights for each of the plurality of distinct machine learning models defining the component mixture of the subscriber-specific machine learning ensemble.

In one embodiment, the validation phase includes: generating by the subscriber-specific machine learning ensemble a plurality of threat scores based on an input of the prescribed subset of the corpus of subscriber-specific digital activity data; generating by a distinct global machine learning model a plurality of global threat scores based on an input of the prescribed subset of the corpus of subscriber-specific digital activity data; and measuring the plurality of threat scores produced by the subscriber-specific machine learning ensemble against the plurality of global threat scores produced by the global machine learning model.

In one embodiment, a machine learning-based method for identifying digital threats includes implementing a machine learning-based digital threat mitigation service over a distributed network of computers; constructing, by the machine learning-based digital threat mitigation service, a subscriber-specific machine learning ensemble that includes a plurality of distinct machine learning models, wherein each of the plurality of distinct machine learning models is configured to perform a distinct machine learning task for identifying a digital threat or digital fraud; constructing a corpus of subscriber-specific digital activity data for training the plurality of distinct machine learning models of the subscriber-specific ensemble; training the subscriber-specific ensemble using at least the corpus of subscriber-specific digital activity data; and deploying the subscriber-specific ensemble.

In one embodiment, the subscriber-specific machine learning ensemble comprises a machine learning-based digital threat scoring model that is associated with an account of the subscriber hosted by the machine learning-based digital threat mitigation service.

In one embodiment, the method identifying weights of a component mixture of the subscriber-specific machine learning ensemble during a validation phase of the subscriber-specific machine learning ensemble, wherein the validation phase of the subscriber-specific machine learning ensemble is performed using a prescribed subset of the corpus of subscriber-specific digital activity data.

In one embodiment, identifying weights includes: computing a linear set of weights for each of the plurality of distinct machine learning models defining the component mixture of the subscriber-specific machine learning ensemble.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
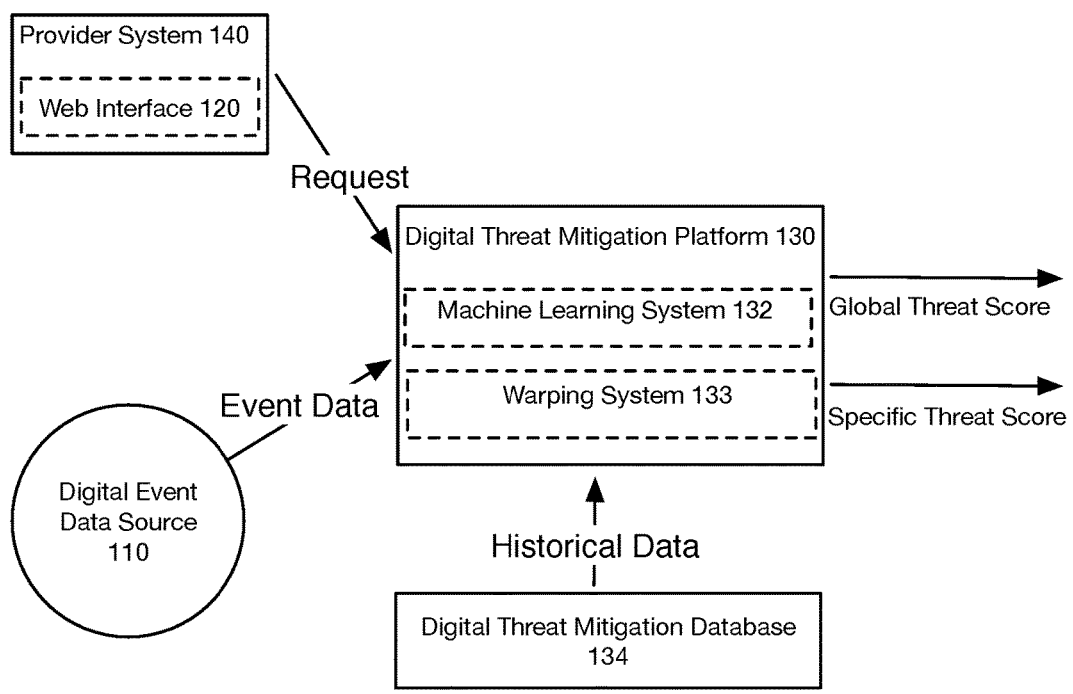
FIG. 1 illustrates a schematic representation of a system in accordance with one or more embodiments of the present application.
Figure 3:
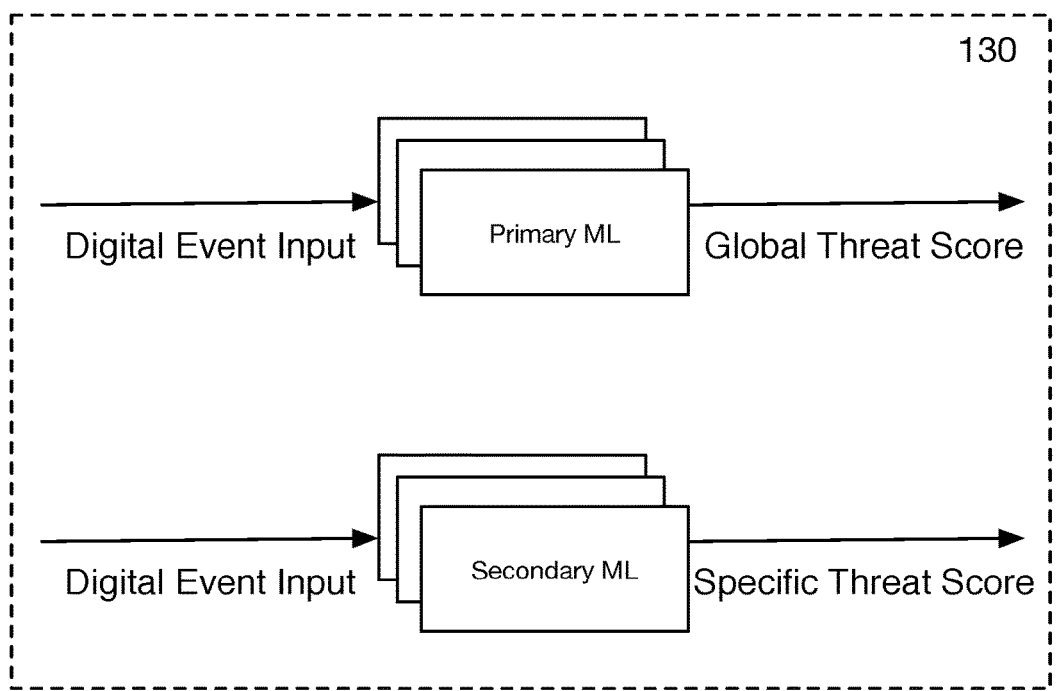
FIG. 3 illustrates an example schematic of a digital threat mitigation platform in accordance with one or more embodiments of the present application.
Figure 4:
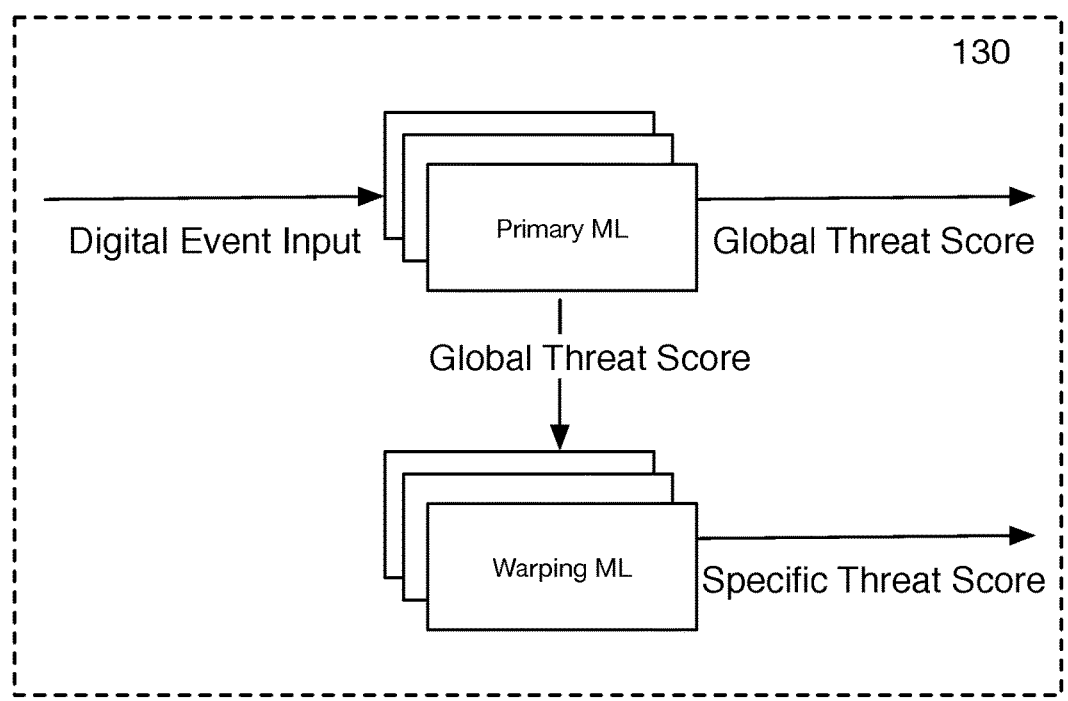
FIG. 4 illustrates an example schematic of a digital threat mitigation platform in accordance with one or more embodiments of the present application.
Figure 5:
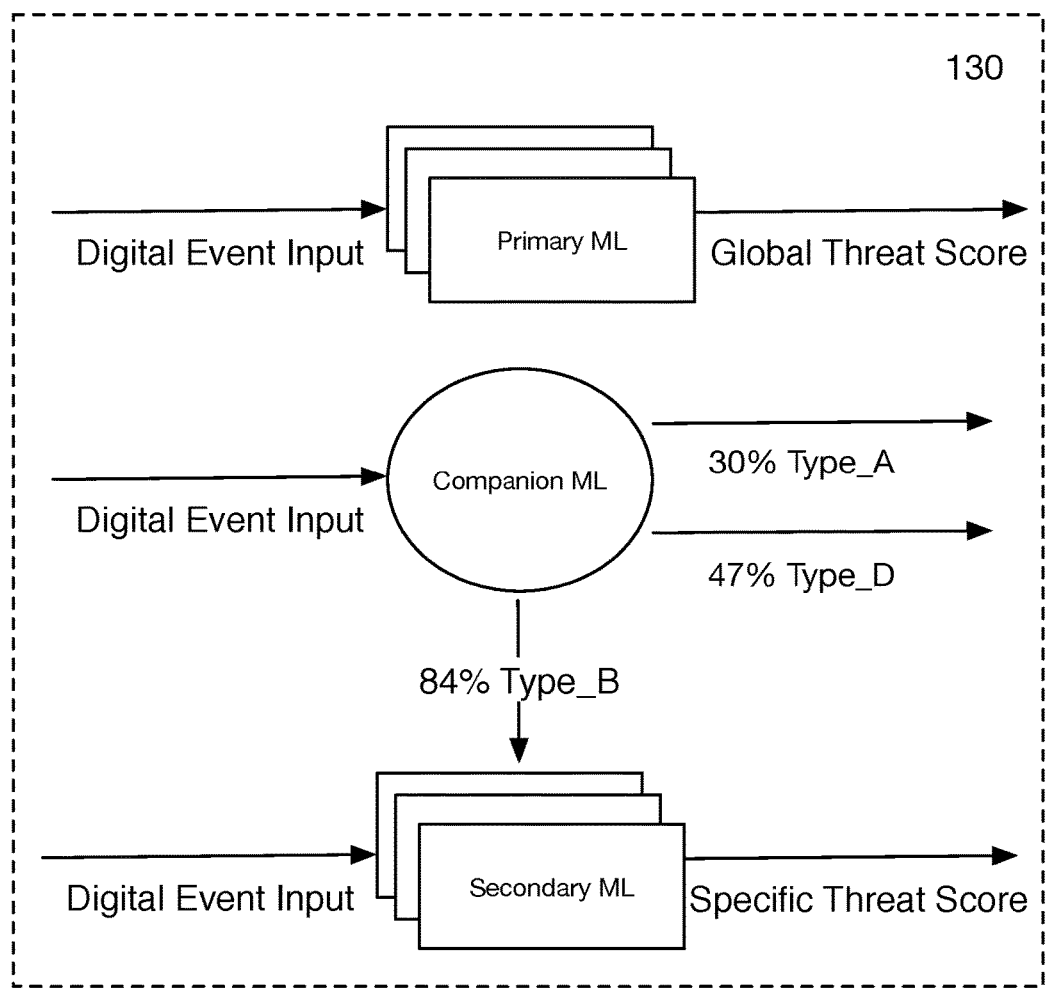
FIG. 5 illustrates an example schematic of a digital threat mitigation platform in accordance with one or more embodiments of the present application.
Figure 6:
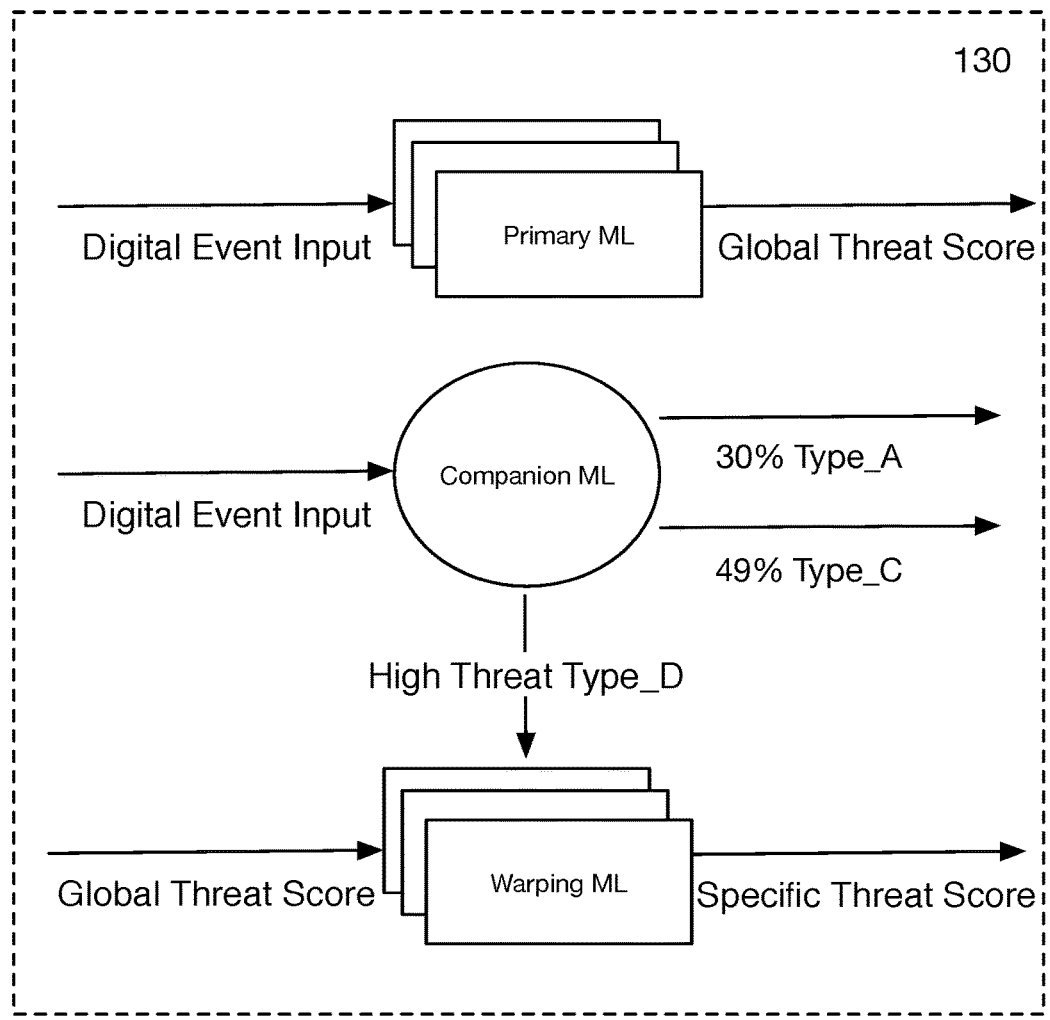
FIG. 6 illustrates an example schematic of a digital threat mitigation platform in accordance with one or more embodiments of the present application.

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

1.1 Overview: Service Provider-Specific Machine Learning-Based Ensemble

Additionally, recognizing that having a single constant set of weights for the predictive models implemented by the threat scoring service for all subscribers and/or service providers who rely on the threat scoring platform and service fails to take into account the differences in the behavior and level of digital threats due to the varying attributes of the subscribers and their services offered to users. One or more embodiments of the present application, however, may function to create subscriber-specific digital threat scoring models that are appropriately weighted to generate highly accurate and specific threat scores for a given subscriber.

2. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140, as described in U.S. patent application Ser. No. 15/653,373, which is incorporated herein in its entirety by this reference.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 110 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources no. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources no and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating end-point health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores.

Additionally, as shown in FIG. 2-FIG. 6, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

3. Method for Constructing a Service Provider-Specific Ensemble for Machine Learning-Based Digital Fraud Inference/Classification As shown in FIG. 2, the method 200 for constructing a provider account-specific machine learning-based ensemble for digital threat scoring, inference, and/or classification includes constructing a digital threat scoring model for a subscriber account S210, defining a corpus of subscriber-specific data S220, training a subscriber ensemble and computing weights S230, calibrating the subscriber ensemble S240, and deploying the subscriber ensemble S250.

3.1 Subscriber-Specific Ensemble Construction

S210, which includes constructing a digital threat scoring model for a subscriber account (e.g., online service provider, etc.), may function to define an ensemble of machine learning models that enable a digital threat scoring and/or digital threat identification for a given subscriber account. In some embodiments, S210 may function to define the subscriber-specific ensemble of machine learning models (subscriber ensemble) based on one or more attributes, characteristics and/or metrics associated with the provider, per se, and/or associated with the subscriber data and/or attributes of the subscriber. For instance, in some embodiments, a subscriber to a digital threat prediction service implementing the method 200 may include a large online service provider with high volumes of online data based on transactions originating distinct global regions. In this example, a relative size of the subscriber as well as a quantity of data generating by the activities and/or services offered by the specific online service provider. By contrast, some subscribers may include small online service providers with relatively low volume or limited data originating from domestic transactions.

In a first implementation, S210 may function to define a subscriber digital threat scoring ensemble based on a combination of a plurality of distinct linear machine learning models. That is, S210 may function to identify and/or select a plurality of distinct linear machine learning models that may be best suited for accurately predicting digital threats based on the attributes and/or characteristics of the subscriber.

In a second implementation, S210 may function to define a subscriber digital threat scoring ensemble based on a combination of a plurality of distinct non-linear machine learning models. In this second implementation, S210 may function to identify and/or select a plurality of distinct non-linear machine learning models that may be best suited for accurately predicting digital threats based on attributes of the subscriber. In this second implementation, the digital threat mitigation service implementing the method 200 may include many distinct non-linear machine learning (e.g., hundreds or thousands of distinct non-linear models) that may be available to be selected for inclusion into the subscriber-specific ensemble. Thus, in such implementation, the attributes of the subscriber to the service may function to determine or drive the selection of the distinct non-linear models made available by the service to include or to define the subscriber-specific ensemble.

In a third implementation, S210 may function to define a subscriber digital threat scoring ensemble based on a construction of a (pre-existing) standard and/or global combination of linear machine learning models. In this third implementation, the standard and/or global combination of linear machine learning models may be subscriber-agnostic, such that features or attributes associated with the subscriber and/or the subscriber data may not be factors driving a construction of the subscriber-ensemble and/or the combination of non-linear machine learning models implemented in the subscriber-ensemble.

Preferably, each of the plurality of distinct linear machine learning models defining a given subscriber digital threat scoring ensemble are in a default state in which each of the linear models have not been trained. Thus, each of the machine learning models defining the subscriber ensemble may be in an untrained state.

3.2 Training/Validation Set Construction

S220, which includes defining a corpus of subscriber-specific data for training and/or validation, may function to construct a corpus of subscriber data that may be used in a training and/or validation of the subscriber digital threat scoring ensemble. The subscriber data preferably includes data relating to a plurality of transactions performed by online users or the like using one or more online resources and/or services of the subscriber to the digital threat scoring service. In a preferred embodiment, S220 may function to source the subscriber data via an API, such as the events API, to obtain transaction data, activity data, and the like directly from one or more online-accessible data sources associated with the subscriber. In such preferred implementation, S220 may function to source the subscriber data via the API based on a subscriber identification value and/or subscriber account data. In such implementation, S220 may function to submit a request for subscriber-specific data whereby the request includes one or more of the aforementioned subscriber identifiers, which may then be used to isolate the subscriber data from among data of multiple other subscribers and provided for constructing the corpus of subscriber data.

It shall be noted, however, that any suitable method or technique may be used to obtain subscriber data including, but not limited to, using typical queries for searching and/or retrieving subscriber data from one or more databases accessible to the machine learning-based service.

Additionally, or alternatively, S220 may function to set a training and/or validation configuration for the corpus of subscriber-specific data. In one embodiment, S220 may function to configure the corpus to make available only a subset or portion of the data within the corpus for training the subscriber digital threat scoring ensemble, during a first training phase. In such embodiment, S220 may function to configure the corpus to make available a second subset of the data within the corpus during a second phase of validating the subscriber digital threat scoring ensemble. Accordingly, in response to a completion of the first phase, S220 may function to enable access and/or a use of the second subset of the subscriber-specific data for purposes of validating the subscriber digital threat scoring model. For example, S220 may function to configure the corpus of subscriber data such that 55% of data from the corpus is sampled for training the subscriber ensemble and such that 10% of data from the corpus is provided as input for validating and/or testing a performance of the subscriber ensemble after training (i.e., the first phase) is completed.

It shall be noted that any suitable configuration and/or setting may be applied to the corpus of subscriber data for the purposes of training and/or validating the subscriber ensemble.

3.3 Ensemble Training & Weights Computation

S230, which includes training a subscriber ensemble and computing weights, may function to train the subscriber ensemble with the corpus of subscriber-specific data and further, compute mixture or ensemble weights for the given subscriber ensemble. In one embodiment, S230 may function to train a subscriber ensemble according to a configuration of training/validation corpus for the given subscriber. In such embodiment, S230 may function to train each of the respective component models of the subscriber ensemble until a designated amount of the subscriber data is deployed in the training of the subscriber model. For instance, if the subscriber's corpus of data is configured to deploy 55% of the corpus in training, S230 may function to train the subscriber ensemble until a 55% deployment threshold is satisfied.

In a first implementation, once a subscriber ensemble has been trained during an initial training phase, S230 may function to validate the subscriber ensemble and contemporaneously or in parallel identify weights of the subscriber ensemble. In particular, S230 may function to validate a performance of the subscriber model by testing the model using a prescribed or predetermined subset of the subscriber corpus. The prescribed or predetermined subset of the subscriber corpus is preferably different from a subset of the subscriber subset used in training the subscriber ensemble. In such embodiment, S230 may function to provide the subset of data (typically data of a specific user or user account) from the subscriber corpus and generate (threat) scores and/or labels for that specific user and/or user account. As described in more detail below, the generated scores may be validated against threat scores generated (in parallel) by a standard, non-subscriber-specific ensemble or model. That is, the threat scores produced by the subscriber ensemble may be measured or compared against threat scores generated by a standard or global threat score model (i.e., non-subscriber-specific based on an input of the same subscriber data.

Additionally, or alternatively, S230 may function to compute and store weights for the component mixture of the subscriber ensemble. In one embodiment, S230 may function to compute a linear set of weights for each of a plurality of distinct linear model components of the subscriber ensemble. For instance, in one implementation, S230 may function to function to cause the trained subscriber ensemble to generate a set of labeled score vectors for one or a plurality of distinct users, preferably identified from the subscriber's corpus of data. In this implementation, S230 may function to execute a logistic regression on the set of labeled score vectors. Accordingly, the results of the logistic regression may be assigned or identified as the ensemble weights and/or mixture weights for the subscriber's ensemble.

It shall be noted that while, in some embodiments, a logistic regression may be used to compute weights for a subscriber's ensemble, any suitable computation may be used including, but not limited to, linear regression, decision forests, and grid search or the like.

Preferably, the linear set of weights computed by S230 function to optimize an area under the curve (AUC) under an ROC of the subscriber ensemble; meaning that the subscriber ensemble is optimized for generating accurate predictions for the specific subscriber. In some embodiments, the weights may include discrete weight values for each of the component linear models that make up a subscriber ensemble.

In live use, the weights for a given subscriber to the digital threat scoring service implementing the method 200 may be referenced and deployed in a global or standard linear (or non-linear) mixture that is implemented by the service when a threat scoring request (via an API or the like) is made by or for the given subscriber.

3.4 Score Calibration

Optionally, or additionally, S240, which includes calibrating the subscriber ensemble, may function to migrate a subscriber from threat scores being generated by a prior or global model to the subscriber ensemble that is specifically configured to handle threat scoring for the subscriber. In particular, the threat scores generated by the subscriber ensemble may be calibrated in accordance with the techniques and methods described in U.S. patent application Ser. No. 15/941,175 ('175), which is incorporated herein in its entirety by this reference. S240 may function to generally migrate the subscriber from the prior global threat scoring model of the digital threat scoring service to the subscriber ensemble by exposing to the subscriber the threat scores output by the subscriber ensemble in lieu of the threat scores output by the prior, global threat scoring model of the service.

Additionally, or optionally, S240 may function to test a behavior of the subscriber ensemble to confirm that the classification or predictive accuracy of the subscriber ensemble is improved relative to a predictive accuracy of the prior or global model. Accordingly, S240 may function to enable same digital event data or subscriber data to be received by the global model as well as the subscriber ensemble. S240 may subsequently generate an ROC curve for each of the global model and the subscriber ensemble to verify that the area under curve (AUC) of the ROC curve for the subscriber ensemble is greater than the AUC of the ROC curve for the global model. In the case that the AUC of the ROC curve of the subscriber ensemble is greater than the AUC of the ROC curve of the global model, S240 may function to validate the improved classification and/or predictive accuracy of the subscriber ensemble.

Additionally, or alternatively, S240 may function to calibrate the subscriber ensemble such that the threat scores output by the subscriber ensemble are in general alignment or match a quantiles distribution of a prior or global threat scoring model implemented by the machine learning-based digital threat mitigation service.

3.5 Live Deployment

S250, which includes deploying the subscriber ensemble, may function to return digital threat scores to a given subscriber based on a live deployment of the subscriber ensemble. Preferably, once the subscriber ensemble has been validated, S250 may function to move the threat score values generated by a subscriber ensemble from a shadow mode, in which they are not publicly exposed, to a live mode in which threat scores and/or threat labels generated by the subscriber model may be publicly exposed in response to a threat score and/or threat label request.

As described in U.S. Patent Application '175, a remapping status of a calibrated digital threat score distribution of the subscriber ensemble may trigger the shift from shadow mode to publicly exposing or returning the predictive values of the subscriber ensemble.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based system for identifying digital threats, the system comprising:
 a distributed network of computers implementing a machine learning-based digital threat mitigation service that:
  constructs a subscriber-specific machine learning ensemble of a plurality of distinct machine learning models, wherein each of the plurality of distinct machine learning models is configured to perform a distinct machine learning task for identifying a digital threat or digital fraud;
  constructs a corpus of subscriber-specific digital activity data for training the plurality of distinct machine learning models of the subscriber-specific machine learning ensemble;
  trains the subscriber-specific machine learning ensemble using at least the corpus of subscriber-specific digital activity data;
  identifies weights of a component mixture of the subscriber-specific machine learning ensemble during a validation phase of the subscriber-specific machine learning ensemble, wherein the validation phase of the subscriber-specific machine learning ensemble is performed using a prescribed subset of the corpus of subscriber-specific digital activity data, wherein
  the validation phase includes:
   generating by the subscriber-specific machine learning ensemble a plurality of threat scores based on an input of the prescribed subset of the corpus of subscriber-specific digital activity data;

generating by a distinct global machine learning model a plurality of global threat scores based on an input of the prescribed subset of the corpus of subscriber-specific digital activity data; and measuring the plurality of threat scores produced by the subscriber-specific machine learning ensemble against the plurality of global threat scores produced by the global machine learning model;

deploys the subscriber-specific machine learning ensemble.

2. The system according to claim 1, wherein the machine learning-based digital threat mitigation service:

calibrates threat scores generated by the subscriber-specific machine learning ensemble against threat scores generated by a pre-existing, global machine learning model; and migrates the subscriber from the pre-existing, global machine learning model to the subscriber-specific machine learning ensemble based on the calibration.

3. The system according to claim 1, wherein:

deploying the subscriber-specific machine learning ensemble is based on a successful calibration of threat scores produced by the subscriber-specific machine learning ensemble; and deploying the subscriber-specific machine learning ensemble includes exposing the threat scores of the subscriber-specific machine learning ensemble in lieu of threat scores produced by a pre-existing, global machine learning model that is implemented by the machine learning-based digital threat mitigation service.

4. The system according to claim 1, wherein subscriber-specific digital activity data includes data relating to a plurality of transactions performed by online users or the like using one or more online resources and/or services of the subscriber to the digital threat scoring service.

5. The system according to claim 1, wherein the subscriber-specific machine learning ensemble comprises a machine learning-based digital threat scoring model that is associated with an account of the subscriber hosted by the machine learning-based digital threat mitigation service.

6. The system according to claim 1, wherein a composition of the plurality of distinct machine learning models defining the subscriber-specific machine learning ensemble is based on one or more attributes of the corpus of subscriber-specific digital activity data.

7. The system according to claim 1, wherein the plurality of distinct machine learning models defining the subscriber-specific machine learning ensemble include a subset distinct machine learning models selected from a plurality of machine learning models made available by the machine learning-based digital threat mitigation service.

8. The system according to claim 1, wherein the machine learning-based digital threat mitigation service:

sets a training and/or validation configuration of the corpus of subscriber-specific digital activity data, wherein setting the training and/or validation configuration includes configuring the corpus of subscriber-specific digital activity data to make available only a first subset of the corpus of subscriber-specific digital activity data during a first phase of training the subscriber-specific machine learning ensemble.

9. The system according to claim 1, wherein the machine learning-based digital threat mitigation service:

sets a training and/or validation configuration of the corpus of subscriber-specific digital activity data, wherein setting the training and/or validation configuration includes configuring the corpus of subscriber-specific digital activity data to make available only a second subset of the corpus of subscriber-specific digital activity data during a second phase of validating the subscriber-specific machine learning ensemble.

10. The system according to claim 1, wherein:

the machine learning-based digital threat mitigation service to a plurality of distinct subscribers; and the subscriber-specific machine learning ensemble is distinct from other subscriber ensembles associated with other subscribers of the plurality distinct subscribers.

11. The system according to claim 1, wherein identifying weights includes:

computing a linear set of weights for each of the plurality of distinct machine learning models defining the component mixture of the subscriber-specific machine learning ensemble.

12. A machine learning-based method for identifying digital threats, the method comprising:

implementing a machine learning-based digital threat mitigation service over a distributed network of computers;

constructing, by the machine learning-based digital threat mitigation service, a subscriber-specific machine learning ensemble that includes a plurality of distinct machine learning models, wherein each of the plurality of distinct machine learning models is configured to perform a distinct machine learning task for identifying a digital threat or digital fraud;

constructing a corpus of subscriber-specific digital activity data for training the plurality of distinct machine learning models of the subscriber-specific ensemble;

training the subscriber-specific ensemble using at least the corpus of subscriber-specific digital activity data;

identifying weights of a component mixture of the subscriber-specific machine learning ensemble during a validation phase of the subscriber-specific machine learning ensemble, wherein the validation phase of the subscriber-specific machine learning ensemble is performed using a prescribed subset of the corpus of subscriber-specific digital activity data, wherein the validation phase includes:

generating by the subscriber-specific machine learning ensemble a plurality of threat scores based on an input of the prescribed subset of the corpus of subscriber-specific digital activity data;

generating by a distinct global machine learning model a plurality of global threat scores based on an input of the prescribed subset of the corpus of subscriber-specific digital activity data; and measuring the plurality of threat scores produced by the subscriber-specific machine learning ensemble against the plurality of global threat scores produced by the global machine learning model; and deploying the subscriber-specific ensemble.

13. The method according to claim 12, wherein the subscriber-specific machine learning ensemble comprises a machine learning-based digital threat scoring model that is associated with an account of the subscriber hosted by the machine learning-based digital threat mitigation service.

14. The method according to claim 12, wherein identifying weights includes:
   computing a linear set of weights for each of the plurality of distinct machine learning models defining the component mixture of the subscriber-specific machine learning ensemble.

15. The method according to claim 12, wherein identifying weights includes:
   computing a non-linear set of weights for each of the plurality of distinct machine learning models defining the component mixture of the subscriber-specific machine learning ensemble.

* * * * *